L. M. PERKINS.
SYSTEM OF CONTROL.
APPLICATION FILED APR. 4, 1916.

1,300,293.

Patented Apr. 15, 1919.

WITNESSES:

INVENTOR
Laurence M. Perkins.
BY
ATTORNEY

UNITED STATES PATENT OFFICE.

LAURENCE M. PERKINS, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,300,293.  Specification of Letters Patent.  Patented Apr. 15, 1919.

Application filed April 4, 1916. Serial No. 88,788.

*To all whom it may concern:*

Be it known that I, LAURENCE M. PERKINS, a citizen of the United States, and a resident of Wilkinsburg, in the county of Allegheny and State of Pennsylvania, have invented a new and useful Improvement in Systems of Control, of which the following is a specification.

My invention relates to systems of control and especially to the regenerative control of electric railway motors and the like.

In a co-pending application of R. E. Hellmund, Serial No. 44,443, filed August 9, 1915, and assigned to the Westinghouse Electric & Manufacturing Company, is shown and described a direct-current, regenerative-control system wherein a momentum-driven armature is connected in series relation with a variable resistor across a supply circuit, and the main field winding and a suitable constant-voltage source of energy, such as a generator armature of a motor-generator set, are connected in parallel relation to the variable resistor. As the speed of the momentum-driven machine decreases, the variable resistor is gradually decreased in active-circuit value, whereby the excitation of the field winding is correspondingly increased to maintain a substantially constant armature or regenerated current. Moreover, in all other systems, of this general class with which I am familiar, either translating devices, such as resistors, are varied, or the field excitation of the exciting machine is manipulated by some controlling device to compensate for the gradual decrease of speed of the main machine.

One of the objects of my present invention is to provide a system of the class under consideration wherein the desired substantially constant regenerated current or voltage is inherently maintained without requiring the manipulation of variable resistors or other controlling devices.

Another object of my invention is to so connect the auxiliary exciting machine in circuit that an initial energizing current therefor is provided in the proper direction, whereby the voltage of the exciting armature is built up at a relatively rapid rate.

Figure 1:
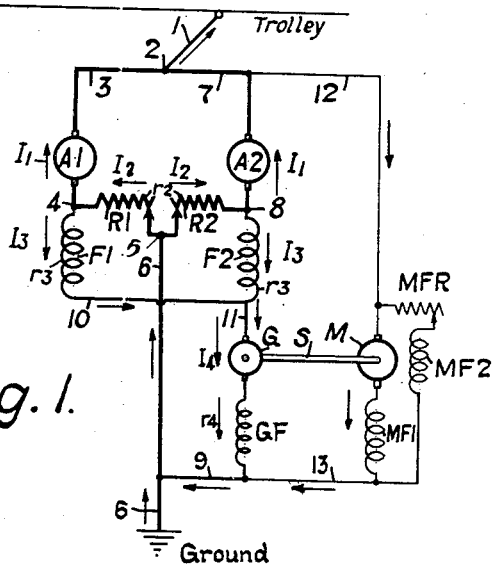
Figure 2:
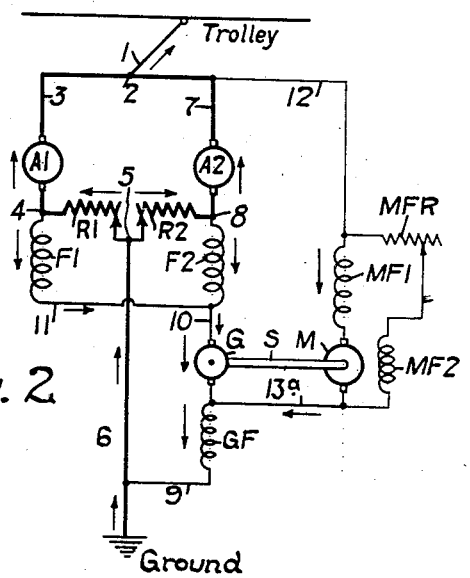

My invention may best be understood by reference to the accompanying drawing, wherein Figure 1 is a diagrammatic view of a system of control embodying my invention; and Fig. 2 is a similar view of a modified system.

Referring to Fig. 1 of the drawing, the system shown comprises a plurality of suitable supply-circuit conductors respectively marked "Trolley" and "Ground"; a plurality of main dynamo-electric machines respectively having armatures A1 and A2 and field-magnet windings F1 and F2 of the series type; a motor-generator set MG that is driven from the supply-circuit for the purpose of furnishing exciting energy to the main fired windings, as hereinafter more fully set forth; and a plurality of main-circuit resistors R1 and R2 that are adapted for variation only under predetermined conditions.

The motor-generator set is shown as comprising a motor or driving armature winding M with which is associated a series field winding MF1 and a shunt field winding MF2 that may be connected through a suitable variable resistor MFR across the armature M and field winding MF1; and an exciting or generator armature winding G that may be mechanically associated with the armature M in any suitable manner, as by a shaft $s$, and a field winding GF that is connected in series relation with the armature winding G.

Inasmuch as my invention pertains only to the regulation of regenerated current, as the speed of a momentum-driven main machine decreases during the regenerative period, it is not deemed necessary to illustrate or describe switching means for initially connecting the various machines in the manner that is shown or to set forth the manner in which regeneration of the main machines is inaugurated. The specific main-circuit connections about to be described form no material, although a preferred, part of my present invention, being employed for illustrative purposes only.

The illustrated circuit connections will first be traced in detail, a general discussion of the operation of my invention will then be given and, finally, a mathematical demonstration of the properties of my invention will be set forth.

The main-circuit connections are established from the Trolley through conductor 1, junction point 2 where the circuit divides, one branch including conductor 3, main armature A1, junction-point 4, resistor R1, junction point 5, and conductor 6 to the other supply-circuit conductor Ground, and the other branch including conductor 7, main armature A2, junction point 8, main resistor R2, and junction-point 5 to the conductor 6.

The main field-exciting circuit is established from the positive terminal of the auxiliary armature winding G through the series field winding GF, conductors 9 and 6, junction point 5, where the circuit divides, one branch including the main resistor R1, main field winding F1, conductors 10 and 11 to the negative terminal of the armature G, and the other branch including main resistor R2, junction point 8 and main field winding F2 to the negative conductor 11.

Each of the main armatures is thus connected through one of the main-circuit resistors R1 or R2 across the supply-circuit conductors, while the corresponding main field winding, the auxiliary exciting armature G and the series field winding GF are connected in parallel relation to the respective main-circuit resistors. It will be observed that the main armature or regenerated current traverses the main-circuit resistors R1 and R2 in the same direction as the current from the exciting armature winding G, bearing in mind that during regenerative operation the ordinarily negative supply-circuit conductor Ground is actually of positive polarity. The direction of the currents in the various circuits is clearly indicated by the arrows.

The driving-motor circuit for the motor-generator set is completed from the conductor 7 through conductor 12, the armature winding M, series field winding MF1 and conductors 13 and 9 to the ground conductor 6.

It will be understood that the specific arrangement of windings of the driving motor in question is not material to my present invention, and any suitable arrangement which preferably produces a substantially constant speed of the motor-generator set, may be employed.

As previously stated, prior regulating schemes for maintaining a substantially constant regenerated voltage, or rate of retardation, as the speed of a momentum-driven machine decreases have employed variable resistors to accomplish the intended functions, whereas, the present invention is adapted to inherently perform the desired regulation without requiring any changes in the field-circuit or armature-circuit resistance, as hereinafter demonstrated mathematically.

The resistors R1 and R2, as previously mentioned, retain a fixed value in connection with the operation of my present invention, for any given rate of retardation, although the resistors may, if desired, be varied near the end of the regenerative period, as set forth later, to effect further braking action. The fixed values of the resistors are chosen in accordance with the electrical characteristics of the main machines and of the exciting machine to produce the desired results, as will be clear without further exposition. However, although the resistors do not need to be varied by reason of speed changes until predetermined saturation conditions set in, as described below, the initial value of the resistors may be adjusted to produce any desired rate of retardation, and the rate may be varied at any time during the regenerative period by simply re-adjusting the resistors to have another suitable fixed value. The resistors also have a current-equalizing function with respect to the parallel-related main-armature circuits, which may be briefly explained as follows: Since both the regenerated current and the main-field-winding current traverse the resistor $R^1$, for example, in the same direction, as previously pointed out, it follows that, upon an incipient increase of regenerated current in the main armature A1 the voltage drop across the resistor R1 is correspondingly increased, whereby the voltage available for delivery to the allied field winding F1 from the generator armature G is reduced in proportion. In this way, the armature current in question is rapidly and inherently restored to its normal value. The converse action occurs in the event of a temporary decrease of regenerated current, and similar inherent functions obtain in the case of the other main machine. The feature just recited is not of my present invention, but is fully set forth and claimed in the aforementioned copending application of R. E. Hellmund.

It will be understood that the amount of regenerated current is primarily dependent upon the value of main field-winding current and, moreover, such regenerated current must never exceed a predetermined ratio to the simultaneous field-winding current in order to prevent the possibility of excessive field-flux distortion and relatively high voltage between commutator bars, with the consequent liability of "flash-over" conditions in the machines. The ratio in question, of course, varies in different motors in accordance with the mechanical and electrical characteristics thereof, as will be appreciated. This being the case, the ideal method of regulating the amount of armature current is to maintain the prescribed ratio between such current and the field-winding current to maintain a maximum regenerated current as the machine speed drops off. Since a substantially constant regenerated voltage, which is slightly higher than the supply-circuit voltage, is preferable, the field-winding current should vary practically inversely as the speed, that is, provided the machines are operated along the straight-line portion of the magnetization curve, or, in other words, below the knee thereof and before saturation of the machines occurs. It is during such operation of the machines that my invention is adapted to be employed, and, if further regenerative operation is desired after the main or the auxiliary machines have become saturated, any suitable prior type of regulation, such as varying the field-circuit resistance, may be utilized. As will be understood, the effect of such saturation of the main motors and of the auxiliary generator is to decrease the amount of regenerated current at low motor speeds, even though the exciting current is rapidly increased.

To mathematically demonstrate that the auxiliary armature winding G, in connection with its series field winding GF, is inherently adapted, by reason of the series characteristics of the substantially constant-speed motor-generator set, to vary the main field-winding current in substantially inverse proportion to the main-machine speed and thus maintain a practically constant regenerated voltage, the following equations may be employed.

Let—

$I_1$ represent the current that traverses each of the main armatures A1 and A2, $I_2$ represent the combined regenerated and auxiliary exciting current that traverses each of the main-circuit resistors R1 and R2, $I_3$ represent the current that traverses each of the main field windings F1 and F2, and $I_4$ represent the current traversing the auxiliary armature winding G and its series field winding GF;

Also let—

$r_2$ represent the resistance value in ohms, for example, of each of the main-circuit resistors R1 and R2, $r_3$ represent the resistance value of each of the main field windings F1 and F2, and $r_4$ represent the resistance value of the series field winding GF;

and let—

E represents the instantaneous voltage of the exciting armature winding G.

Then it will be observed that $$I_4 = 2I_3 \quad (1)$$

and $$I_2 = I_1 + I_3 \quad (2)$$

and $E = I_4$ times some constant, as K, which is proportional to the product of the substantially constant speed of the armature G and the active length of conductor that cuts the field flux which corresponds to the current $I_4$, in accordance with familiar principles, during operation along the straight-line portion of the magnetization curves;

Therefore $$E = KI_4 = 2KI_3 = I_2 r_2 + I_3 r_3 + I_4 r_4,$$

which represents the summation of the resistance drops in the circuit of the armature winding G.

Substituting from equations (1) and (2)

$$2KI_3 = I_1 r_2 + I_3 r_2 + I_3 r_3 + 2I_3 r_4$$

Transposing and dividing we have, $$I_1 = I_3 \left( \frac{2K - r_2 - r_3 - 2r_4}{r_2} \right) = K' I_3$$

since $r_2$, $r_3$ and $r_4$ remain substantially constant and K is substantially constant until the generator armature G or the main machines become saturated.

In brief, therefore, the regenerated current bears a constant ratio to the current that traverses the main field windings during the regenerative period until saturation conditions occur in the magnetic circuits of one or more of the several machines, while maintaining the resistance of the main field-winding and main armature circuits unchanged. The generator of the motor-generator set, by reason of its series characteristics and substantially constant speed, thus inherently and automatically varies the main field-winding current as the speed of the momentum-driven machines decreases, without requiring manipulation of any main or auxiliary circuit resistors, as has been customary practice, thereby maintaining any desired constant rate of retardation, in accordance with the selected value of the main-circuit resistors. If desired, when the above-mentioned saturation conditions have set in, the resistors R1 and R2 may be gradually eliminated from circuit, by a suitable controller or set of switches for simultaneously governing said resistors, to further maintain the desired substantially constant regenerated voltage. The switching means for varying the resistors are conventionally indicated by the arrow-heads that are located near the inner ends thereof.

Referring now to Fig. 2, the difference from the system of Fig. 1 resides in the connection of the lower-voltage terminal of the motor of the motor-generator set through conductor 13$_a$, which corresponds to conductor 13 of Fig. 1, to a point intermediate the auxiliary armature winding G and the series field winding GF. Consequently, the series field winding GF is initially energized in the proper direction in accordance with the current that traverses the auxiliary driving motor armature M, thus insuring a relatively rapid building up of the voltage of the auxiliary armature winding G when connected to the main field-winding circuit during the preliminary regenerative period. Such a result is desirable in order to obtain not only a positive assurance that the voltage of the armature winding G will build up in the right direction, but also that the voltage of the main momentum-driven machines will be increased at a correspondingly rapid rate, whereby regenerative connection to the supply circuit may be effected within a relatively short space of time, thus increasing the economies effected by regenerative operation to a certain extent.

I do not wish to be restricted to the specific circuit connections or the location and arrangement of parts that are herein set forth, as various modifications thereof may be effected without departing from the spirit and scope of my invention. I desire, therefore, that only such limitations shall be imposed as are indicated in the appended claims.

I claim as my invention:

1. In a system of control, the combination with a momentum-driven main dynamo-electric machine having an armature and a field-magnet winding, of an auxiliary self-excited, substantially constant-speed dynamo-electric machine for exciting said field winding and inherently adapted to vary the field-winding current in substantially inverse proportion to the main machine speed while maintaining the resistance of the field-winding circuit unchanged.

2. In a system of control, the combination with a momentum-driven main dynamo-electric machine having an armature and a field-magnet winding, of a self-excited auxiliary generating substantially constant-speed machine having series characteristics for exciting the main field winding while maintaining the resistance of the field-winding circuit unchanged.

3. In a system of control, the combination with a momentum-driven main dynamo-electric machine having an armature and a field-magnet winding, of a normally-non-variable translating device, and an auxiliary generating machine having an armature and a series-related field winding connected to excite the main field winding through said non-variable translating device until a predetermined degree of saturation obtains in the auxiliary machine, to inherently maintain a substantially constant regenerated voltage.

4. In a system of control, the combination with a momentum-driven main dynamo-electric machine having an armature and a field-magnet winding, of a translating device connected in series relation with said main armature, and an auxiliary generating machine of substantially constant speed having an armature and a series-related field winding connected in circuit with the main field winding and said translating device to effect the traversal of the main field-winding current through said translating device in the same direction as the main armature current, whereby a substantially constant regenerated voltage is inherently supplied while maintaining the active value of said translating device unchanged until a predetermined speed of the main machine obtains.

5. In a system of control, the combination with a momentum-driven main dynamo-electric machine having an armature and a field-magnet winding, of a resistor connected in series relation with said main armature, an auxiliary generating machine having an armature and a series-related field winding connected through the main field winding in parallel relation to said resistor to effect the traversal of main field-winding current through said resistor in the same direction as the main armature current, whereby a substantially constant regenerated voltage is inherently supplied, the resistance of the field winding circuit remaining unchanged until a predetermined degree of saturation of the machines obtains, and means for subsequently varying said resistor to further maintain the desired value of regenerated current.

6. In a system of control, the combination with a supply-circuit and a momentum-driven main dynamo-electric machine having an armature and a field magnet winding, of an auxiliary exciting dynamo-electric machine for said field winding also having an armature and a series-related field winding, a driving motor armature for said auxiliary machine, and means for connecting said auxiliary field winding in circuit with said motor armature to effect a relatively rapid initial building up of voltage in the auxiliary armature.

7. In a system of control, the combination with a supply-circuit and a momentum-driven main dynamo-electric machine having an armature and a field magnet winding, of an auxiliary generating substantially constant-speed machine having series characteristics for exciting the main field winding while maintaining the resistance of the field-winding circuit unchanged, a driving motor armature for said auxiliary machine, and means for so connecting said motor armature to said auxiliary field winding that current traverses it in the proper direction to effect relatively rapid initial building up of voltage in the auxiliary armature.

8. In a system of control, the combination with a supply circuit and a momentum-driven main dynamo-electric machine having an armature and a field-magnet winding, of a resistor connected in series relation with said main armature, an auxiliary generating machine having an armature and a series-related field winding connected through the main field winding in parallel relation to said resistor to effect the traversal of main field-winding current through said resistor in the same direction as the main armature current, whereby a substantially constant regenerated voltage is inherently supplied, the resistance of the field-winding circuit remaining unchanged until a predetermined degree of saturation of the auxiliary machine obtains, and a driving motor armature for said auxiliary machines connected through said auxiliary field winding across the supply current.

9. In a system of control, the combination with a momentum-driven main dynamo-electric machine having an armature and a field-magnet winding, of a normally non-variable translating device, an auxiliary generating machine having an armature and a series-related field winding connected to excite the main field winding through said translating device until a predetermined degree of saturation obtains in the auxiliary machine to inherently maintain a substantially constant voltage, and means for varying said translating device under predetermined conditions to correspondingly vary the rate of regeneration.

10. In a system of control, the combination with a momentum-driven main dynamo-electric machine having an armature and a field-magnet winding, of a resistor connected in series relation with said main armature, an auxiliary generating machine having an armature and a series-related field winding connected through the main field winding in parallel relation to said resistor to effect the traversal of main field-winding current through said resistor in the same direction as the main armature current, whereby a substantially constant rate of retardation corresponding to the value of said resistor inherently obtains until a predetermined degree of saturation occurs in the machines, and means for varying the initial value of said resistor to correspondingly vary the constant rate of retardation.

In testimony whereof, I have hereunto subscribed my name this 28th day of March, 1916.

L. M. PERKINS.